US011132691B2

(12) United States Patent
Hammad

(10) Patent No.: US 11,132,691 B2
(45) Date of Patent: Sep. 28, 2021

(54) MERCHANT ALERTS INCORPORATING RECEIPT DATA

(71) Applicant: Visa International Service Association, San Francisco, CA (US)

(72) Inventor: Ayman Hammad, Pleasonton, CA (US)

(73) Assignee: Visa International Service Association, San Francisco, CA (US)

(*) Notice: Subject to any disclaimer, the term of this patent is extended or adjusted under 35 U.S.C. 154(b) by 978 days.

(21) Appl. No.: 15/144,045

(22) Filed: May 2, 2016

(65) Prior Publication Data
US 2016/0247155 A1 Aug. 25, 2016

Related U.S. Application Data

(63) Continuation of application No. 12/953,178, filed on Nov. 23, 2010, now abandoned.
(Continued)

(51) Int. Cl.
*G06Q 20/40* (2012.01)
*G06Q 20/20* (2012.01)
(Continued)

(52) U.S. Cl.
CPC ......... *G06Q 20/405* (2013.01); *G06Q 20/042* (2013.01); *G06Q 20/047* (2020.05);
(Continued)

(58) Field of Classification Search
CPC .. G06Q 20/20; G06Q 20/0453; G06Q 20/209; G06Q 20/202; G06Q 20/32
See application file for complete search history.

(56) References Cited

U.S. PATENT DOCUMENTS

| 3,935,933 A | 2/1976 | Tanaka et al. |
| 4,011,433 A | 3/1977 | Tateisi et al. |

(Continued)

FOREIGN PATENT DOCUMENTS

| AU | 200039412 A1 | 12/2000 |
| BE | 1002756 A6 | 5/1991 |

(Continued)

OTHER PUBLICATIONS

"Internet Based Secure Transactions Using Encrypting Applets and CGI-Scripts Independent of Browser or Server Capabilities"; 1998; pp. 800-801; No. 410116; IBM Research Disclosure.
(Continued)

*Primary Examiner* — Florian M Zeender
*Assistant Examiner* — Milena Racic
(74) *Attorney, Agent, or Firm* — Kilpatrick Townsend & Stockton LLP

(57) ABSTRACT

One embodiment of the invention is directed to a system comprising a server and a consumer device in operative communication with the server. The server comprises a processor and a computer readable medium coupled to the processor. The computer readable medium comprises computer readable program code embodied therein. The computer readable program code is adapted to be executed by the processor to receive an authorization request message for a transaction conducted by a consumer with a merchant, send the authorization request message to an issuer, modify an authorization response message to include receipt preference data, and send the authorization response message comprising the receipt data to the merchant, wherein the merchant generates a receipt for the consumer according to the receipt preference data.

18 Claims, 9 Drawing Sheets

Related U.S. Application Data

(60) Provisional application No. 61/287,071, filed on Dec. 16, 2009.

(51) Int. Cl.

| | | |
|---|---|---|
| *G07G 5/00* | (2006.01) | |
| *G06Q 30/02* | (2012.01) | |
| *G06Q 20/04* | (2012.01) | |
| *G06Q 20/10* | (2012.01) | |
| *G06Q 30/04* | (2012.01) | |
| *G06Q 20/38* | (2012.01) | |
| *G06Q 40/00* | (2012.01) | |

(52) U.S. Cl.
 CPC ........... *G06Q 20/10* (2013.01); *G06Q 20/102* (2013.01); *G06Q 20/105* (2013.01); *G06Q 20/108* (2013.01); *G06Q 20/1085* (2013.01); *G06Q 20/20* (2013.01); *G06Q 20/202* (2013.01); *G06Q 20/209* (2013.01); *G06Q 20/382* (2013.01); *G06Q 20/40* (2013.01); *G06Q 30/0207* (2013.01); *G06Q 30/0221* (2013.01); *G06Q 30/0222* (2013.01); *G06Q 30/0237* (2013.01); *G06Q 30/0238* (2013.01); *G06Q 30/0268* (2013.01); *G06Q 30/04* (2013.01); *G06Q 40/00* (2013.01); *G07G 5/00* (2013.01)

(56) References Cited

U.S. PATENT DOCUMENTS

| | | |
|---|---|---|
| 4,108,350 A | 8/1978 | Forbes, Jr. |
| 4,114,027 A | 9/1978 | Slater et al. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,649,515 A | 3/1987 | Thompson et al. |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,970,658 A | 11/1990 | Durbin et al. |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,412,756 A | 5/1995 | Bauman et al. |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,590,038 A | 12/1996 | Pitroda |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,739,512 A | 4/1998 | Tognazzini |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,790,677 A | 8/1998 | Fox et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,878,337 A | 3/1999 | Joao et al. |
| 5,880,769 A | 3/1999 | Nemirofsky et al. |
| 5,884,271 A | 3/1999 | Pitroda |

(56) References Cited

U.S. PATENT DOCUMENTS

| | | |
|---|---|---|
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,824 A | 4/1999 | Beatson et al. |
| 5,892,827 A | 4/1999 | Beach et al. |
| 5,898,838 A | 4/1999 | Wagner |
| 5,899,998 A | 5/1999 | McGauley et al. |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,019 A | 6/1999 | Ginter et al. |
| 5,915,244 A | 6/1999 | Jack et al. |
| 5,921,686 A | 7/1999 | Baird et al. |
| 5,923,735 A | 7/1999 | Swartz et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsburg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | De Jong |
| 6,052,785 A | 4/2000 | Lin et al. |
| 6,055,509 A | 4/2000 | Powell |
| 6,055,573 A | 4/2000 | Gardenswartz et al. |
| 6,061,660 A | 5/2000 | Eggleston et al. |
| 6,067,526 A | 5/2000 | Powell |
| 6,067,529 A | 5/2000 | Ray et al. |
| 6,070,147 A | 5/2000 | Harms et al. |
| 6,073,238 A | 6/2000 | Drupsteen |
| 6,076,068 A | 6/2000 | Delapa |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,135,351 A | 10/2000 | Shiobara et al. |
| 6,142,369 A | 11/2000 | Jonstromer |
| 6,144,948 A | 11/2000 | Walker et al. |
| 6,151,586 A | 11/2000 | Brown |
| 6,151,587 A | 11/2000 | Mathias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,182,891 B1 | 2/2001 | Furuhashi et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,878 B1 | 2/2001 | Meese |
| 6,195,666 B1 | 2/2001 | Schneck et al. |
| 6,205,435 B1 | 3/2001 | Biffar |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,246,997 B1 | 6/2001 | Cybul et al. |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,325,285 B1 | 12/2001 | Baratelli |
| 6,327,576 B1 | 12/2001 | Ogasawara |
| 6,341,353 B1 | 1/2002 | Herman et al. |
| 6,385,723 B1 | 5/2002 | Richards |
| 6,390,374 B1 | 5/2002 | Carper et al. |
| 6,394,341 B1 | 5/2002 | Makipaa et al. |
| 6,397,194 B1 | 5/2002 | Houvener et al. |
| 6,442,571 B1 | 8/2002 | Haff et al. |
| 6,480,935 B1 | 11/2002 | Carper et al. |
| 6,487,540 B1 | 11/2002 | Smith et al. |
| 6,516,996 B1 | 2/2003 | Hippelainen |
| 6,533,168 B1 | 3/2003 | Ching |
| 6,543,683 B2 | 4/2003 | Hoffman |
| 6,549,773 B1 | 4/2003 | Linden et al. |
| 6,549,912 B1 | 4/2003 | Chen |
| 6,561,417 B1 | 5/2003 | Gadd |
| 6,612,490 B1 | 9/2003 | Herrendoerfer et al. |
| 6,653,940 B2 | 11/2003 | Collura |
| 6,675,153 B1 * | 1/2004 | Cook ............... G06Q 20/02 705/64 |
| 6,681,995 B2 | 1/2004 | Sukeda et al. |
| 6,689,345 B2 | 2/2004 | Lezer |
| 6,772,434 B1 | 8/2004 | Godwin |
| 6,898,598 B2 | 5/2005 | Himmel et al. |
| 6,975,856 B2 | 12/2005 | Ogasawara |
| 7,069,240 B2 | 6/2006 | Spero et al. |
| 7,082,415 B1 | 7/2006 | Robinson et al. |
| 7,088,467 B1 | 8/2006 | Voss et al. |
| 7,177,848 B2 | 2/2007 | Hogan et al. |
| 7,225,156 B2 * | 5/2007 | Fisher ............... G06Q 20/02 235/379 |
| 7,318,049 B2 | 1/2008 | Iannacci |
| 7,356,541 B1 | 4/2008 | Doughty |

(56) References Cited

U.S. PATENT DOCUMENTS

| | | | |
|---|---|---|---|
| 7,461,780 | B2 | 12/2008 | Potts et al. |
| 7,487,912 | B2 | 2/2009 | Seifert et al. |
| 7,552,087 | B2 | 6/2009 | Schultz et al. |
| 7,725,369 | B2 | 5/2010 | Shiftan |
| 7,748,621 | B2 | 7/2010 | Gusler et al. |
| 7,765,162 | B2 * | 7/2010 | Binder ............... G06Q 20/04 705/64 |
| 7,797,192 | B2 | 9/2010 | Mitchell et al. |
| 7,827,077 | B2 | 11/2010 | Shiftan et al. |
| 8,025,216 | B2 | 9/2011 | Potts et al. |
| 8,180,682 | B2 | 5/2012 | Narayanaswami et al. |
| 8,296,229 | B1 | 10/2012 | Yellin et al. |
| 8,429,048 | B2 | 4/2013 | Singh |
| 8,595,058 | B2 * | 11/2013 | Fordyce, III ........... G06Q 20/10 705/14.1 |
| 8,744,906 | B2 * | 6/2014 | Fordyce, III ........... G06Q 30/02 705/14.1 |
| 8,775,243 | B2 * | 7/2014 | Gillenson ............ G06Q 30/02 705/14.1 |
| 2001/0016835 | A1 | 8/2001 | Hansmann et al. |
| 2001/0029483 | A1 | 10/2001 | Schultz et al. |
| 2001/0037312 | A1 | 11/2001 | Gray et al. |
| 2002/0002468 | A1 | 1/2002 | Spagna et al. |
| 2002/0073025 | A1 | 6/2002 | Tanner et al. |
| 2002/0073043 | A1 * | 6/2002 | Herman ............... A63F 13/12 705/64 |
| 2002/0073331 | A1 | 6/2002 | Candelore |
| 2002/0076051 | A1 | 6/2002 | Nii |
| 2002/0077974 | A1 | 6/2002 | Ortiz |
| 2002/0077992 | A1 | 6/2002 | Tobin |
| 2002/0087894 | A1 | 7/2002 | Foley et al. |
| 2002/0128878 | A1 | 9/2002 | Maritzen et al. |
| 2002/0138354 | A1 | 9/2002 | Seal et al. |
| 2002/0179704 | A1 | 12/2002 | Deaton |
| 2002/0188561 | A1 | 12/2002 | Schultz |
| 2003/0014372 | A1 | 1/2003 | Wheeler et al. |
| 2003/0055733 | A1 | 3/2003 | Marshall et al. |
| 2003/0055792 | A1 | 3/2003 | Kinoshita et al. |
| 2003/0093344 | A1 | 5/2003 | Sesek |
| 2003/0121969 | A1 | 7/2003 | Wankmueller |
| 2003/0126020 | A1 | 7/2003 | Smith et al. |
| 2003/0126094 | A1 * | 7/2003 | Fisher ............... G06Q 20/26 705/75 |
| 2003/0182204 | A1 | 9/2003 | Rhee |
| 2003/0187794 | A1 | 10/2003 | Irwin et al. |
| 2003/0233279 | A1 | 12/2003 | Shinzaki |
| 2004/0030601 | A1 | 2/2004 | Pond et al. |
| 2004/0064373 | A1 | 4/2004 | Shannon |
| 2004/0128243 | A1 | 7/2004 | Kavanagh et al. |
| 2004/0141661 | A1 | 7/2004 | Hanna et al. |
| 2004/0204078 | A1 | 10/2004 | Fare et al. |
| 2004/0220964 | A1 | 11/2004 | Shiftan et al. |
| 2004/0225567 | A1 | 11/2004 | Mitchell et al. |
| 2005/0010505 | A1 * | 1/2005 | Darrell ............... G06Q 20/0453 705/35 |
| 2005/0018670 | A1 | 1/2005 | Shigematsu et al. |
| 2005/0076110 | A1 | 4/2005 | Mathew et al. |
| 2005/0080726 | A1 | 4/2005 | Krajewski et al. |
| 2005/0165651 | A1 | 7/2005 | Mohan |
| 2005/0172033 | A1 | 8/2005 | Mathew et al. |
| 2005/0216354 | A1 | 9/2005 | Bam et al. |
| 2006/0004746 | A1 | 1/2006 | Angus et al. |
| 2006/0022033 | A1 | 3/2006 | Smets et al. |
| 2006/0253392 | A1 | 11/2006 | Davies |
| 2006/0261149 | A1 | 11/2006 | Raghavendra Tulluri |
| 2006/0273163 | A1 | 12/2006 | Gusler et al. |
| 2007/0055630 | A1 | 3/2007 | Gauthier et al. |
| 2007/0069013 | A1 * | 3/2007 | Seifert ............... G06Q 20/0453 235/383 |
| 2007/0094154 | A1 | 4/2007 | Rau et al. |
| 2007/0100691 | A1 | 5/2007 | Patterson |
| 2007/0136211 | A1 | 6/2007 | Brown et al. |
| 2007/0205274 | A1 | 9/2007 | Bridges |
| 2007/0205275 | A1 | 9/2007 | Nicola et al. |
| 2007/0214049 | A1 | 9/2007 | Postrel |
| 2008/0040285 | A1 | 2/2008 | Wankmueller |
| 2008/0048022 | A1 | 2/2008 | Vawter |
| 2008/0059375 | A1 | 3/2008 | Abifaker |
| 2008/0183480 | A1 | 7/2008 | Carlson et al. |
| 2008/0201224 | A1 * | 8/2008 | Owens ............... G06Q 30/0213 705/14.14 |
| 2008/0208743 | A1 | 8/2008 | Arthur et al. |
| 2008/0208762 | A1 | 8/2008 | Arthur et al. |
| 2008/0208764 | A1 | 8/2008 | Diffenderffer |
| 2008/0217397 | A1 * | 9/2008 | Degliantoni ........... G06Q 30/02 235/380 |
| 2008/0235105 | A1 | 9/2008 | Payne et al. |
| 2008/0313062 | A1 | 12/2008 | Williams et al. |
| 2009/0037281 | A1 | 2/2009 | Devlin et al. |
| 2009/0089194 | A1 | 4/2009 | Mathis et al. |
| 2009/0099961 | A1 | 4/2009 | Ogilvy |
| 2009/0106053 | A1 | 4/2009 | Walker et al. |
| 2009/0119278 | A1 | 5/2009 | Cross et al. |
| 2009/0140839 | A1 | 6/2009 | Bishop et al. |
| 2009/0248022 | A1 | 10/2009 | Reed et al. |
| 2009/0265252 | A1 | 10/2009 | Fletcher |
| 2009/0271211 | A1 | 10/2009 | Hammad et al. |
| 2009/0271263 | A1 | 10/2009 | Regmi et al. |
| 2009/0271265 | A1 | 10/2009 | Lay et al. |
| 2010/0076836 | A1 * | 3/2010 | Giordano ............ G06Q 20/20 705/14.38 |
| 2010/0082444 | A1 | 4/2010 | Lin et al. |
| 2010/0100434 | A1 | 4/2010 | Sock |
| 2010/0073043 | A1 | 6/2010 | Farley |
| 2010/0159907 | A1 * | 6/2010 | Farley ............... G06Q 20/20 455/418 |
| 2010/0257066 | A1 * | 10/2010 | Jones ............... G06Q 20/202 705/17 |
| 2011/0106714 | A1 | 5/2011 | Junger |
| 2012/0011009 | A1 | 1/2012 | Lindsey et al. |
| 2012/0123943 | A1 | 5/2012 | Potts et al. |
| 2012/0160911 | A1 | 6/2012 | Smith et al. |
| 2012/0203605 | A1 | 8/2012 | Morgan et al. |
| 2012/0203646 | A1 | 8/2012 | Morgan et al. |
| 2012/0203672 | A1 | 8/2012 | Morgan et al. |
| 2012/0203695 | A1 | 8/2012 | Morgan et al. |
| 2012/0203697 | A1 | 8/2012 | Morgan et al. |
| 2012/0209749 | A1 | 8/2012 | Hammad et al. |
| 2012/0221446 | A1 | 8/2012 | Grigg et al. |
| 2012/0253852 | A1 | 10/2012 | Pourfallah et al. |
| 2012/0253915 | A1 | 10/2012 | Sock |
| 2012/0253958 | A1 | 10/2012 | Sock et al. |
| 2012/0271712 | A1 | 10/2012 | Katzin et al. |
| 2012/0278193 | A1 | 11/2012 | Groat et al. |
| 2012/0284130 | A1 | 11/2012 | Lewis et al. |
| 2012/0290422 | A1 | 11/2012 | Bhinder |

FOREIGN PATENT DOCUMENTS

| | | |
|---|---|---|
| CA | 2293944 A1 | 8/2000 |
| CA | 2267041 A1 | 9/2000 |
| CA | 2317138 A1 | 1/2002 |
| CA | 2684 434 A1 | 1/2010 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 203424 A2 | 12/1986 |
| EP | 292248 A2 | 11/1988 |
| EP | 475837 A1 | 3/1992 |
| EP | 540095 A1 | 5/1993 |
| EP | 658862 A2 | 6/1995 |
| EP | 675614 A1 | 10/1995 |
| EP | 682327 A2 | 11/1995 |
| EP | 875841 A2 | 11/1998 |
| EP | 936530 A1 | 8/1999 |
| EP | 938050 A2 | 8/1999 |
| EP | 938051 A2 | 8/1999 |
| EP | 944007 A2 | 9/1999 |
| EP | 949595 A2 | 10/1999 |
| EP | 982692 A2 | 3/2000 |
| EP | 984404 A2 | 3/2000 |

(56) References Cited

FOREIGN PATENT DOCUMENTS

| | | |
|---|---|---|
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| EP | 1085395 A2 | 3/2011 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000112864 A | 4/2000 |
| JP | 2000181764 A | 6/2000 |
| JP | 2001202484 A | 7/2001 |
| JP | 2001236232 A | 8/2001 |
| JP | 2008-140298 A | 6/2008 |
| KR | 10-2000-0039297 A | 5/2001 |
| KR | 2001-0044823 A | 6/2001 |
| KR | 2001-0058742 A | 7/2001 |
| KR | 2002-0021237 A | 3/2002 |
| KR | 10-2002-0051488 A | 6/2002 |
| KR | 10-0795142 B1 | 1/2008 |
| WO | 90/16126 A1 | 12/1990 |
| WO | 96/25724 A1 | 8/1996 |
| WO | 96/38945 A1 | 12/1996 |
| WO | 96/42109 A1 | 12/1996 |
| WO | 97/05582 A1 | 2/1997 |
| WO | 97/10562 A1 | 3/1997 |
| WO | 97/39424 A1 | 10/1997 |
| WO | 98/02834 A1 | 1/1998 |
| WO | 98/09257 A1 | 3/1998 |
| WO | 98/20465 A1 | 5/1998 |
| WO | 98/43169 A2 | 10/1998 |
| WO | 98/43212 A1 | 10/1998 |
| WO | 98/52153 A2 | 11/1998 |
| WO | 99/10824 A1 | 3/1999 |
| WO | 99/16030 A1 | 4/1999 |
| WO | 99/19846 A2 | 4/1999 |
| WO | 99/44172 A1 | 9/1999 |
| WO | 99/45507 A1 | 9/1999 |
| WO | 99/49415 A2 | 9/1999 |
| WO | 99/49426 A1 | 9/1999 |
| WO | 00/39714 A1 | 7/2000 |
| WO | 00/46665 A2 | 8/2000 |
| WO | 00/54507 A1 | 9/2000 |
| WO | 00/57315 A2 | 9/2000 |
| WO | 00/57613 A1 | 9/2000 |
| WO | 00/62265 A1 | 10/2000 |
| WO | 00/62472 A1 | 10/2000 |
| WO | 00/67185 A1 | 11/2000 |
| WO | 00/68797 A1 | 11/2000 |
| WO | 00/68902 A1 | 11/2000 |
| WO | 00/69183 A2 | 11/2000 |
| WO | 00/69803 A1 | 11/2000 |
| WO | 00/75775 A2 | 12/2000 |
| WO | 00/77750 A1 | 12/2000 |
| WO | 00/79411 A2 | 12/2000 |
| WO | 01/04851 A1 | 1/2001 |
| WO | 01/06341 A1 | 1/2001 |
| WO | 01/08087 A1 | 2/2001 |
| WO | 01/13572 A1 | 2/2001 |
| WO | 01/15397 A1 | 3/2001 |
| WO | 01/18633 A1 | 3/2001 |
| WO | 01/18746 A1 | 3/2001 |
| WO | 2001014995 | 3/2001 |
| WO | 01/29672 A1 | 4/2001 |
| WO | 01/33390 A2 | 5/2001 |
| WO | 2001031535 | 5/2001 |
| WO | 01/40908 A2 | 6/2001 |
| WO | 01/42887 A2 | 6/2001 |
| WO | 01/44900 A2 | 6/2001 |
| WO | 01/44949 A2 | 6/2001 |
| WO | 01/47176 A1 | 6/2001 |
| WO | 01/50229 A2 | 7/2001 |
| WO | 01/52575 A1 | 7/2001 |
| WO | 01/55955 A1 | 8/2001 |
| WO | 01/59563 A1 | 8/2001 |
| WO | 01/61620 A1 | 8/2001 |
| WO | 01/65545 A1 | 9/2001 |
| WO | 01/67694 A1 | 9/2001 |
| WO | 01/71648 A2 | 9/2001 |
| WO | 01/71679 A2 | 9/2001 |
| WO | 01/73530 A2 | 10/2001 |
| WO | 01/73533 A1 | 10/2001 |
| WO | 01/78020 A1 | 10/2001 |
| WO | 01/80563 A1 | 10/2001 |
| WO | 01/84377 A2 | 11/2001 |
| WO | 01/84474 A2 | 11/2001 |
| WO | 01/84512 A1 | 11/2001 |
| WO | 01/88705 A1 | 11/2001 |
| WO | 02/06948 A1 | 1/2002 |
| WO | 02/10962 A1 | 2/2002 |
| WO | 02/14991 A2 | 2/2002 |
| WO | 02/15037 A1 | 2/2002 |
| WO | 02/21315 A1 | 3/2002 |
| WO | 02/29577 A2 | 4/2002 |
| WO | 02/088895 A2 | 11/2002 |
| WO | 2005086593 | 9/2005 |
| WO | 06/077281 A1 | 7/2006 |
| WO | 2007038296 | 4/2007 |
| WO | 2007123856 | 11/2007 |

OTHER PUBLICATIONS

Anderson, Alan; "Reading Between the Lines"; Aug. 2000, Enterprise Systems Journal, vol. 15, No. 8, pp. 44.
Commerce unplugged: welcome to the world of wireless commerce. Canadian Grocer: Toronto, Jun. 2001. vol. 115, Issue 5, p. 38.
James G Xack; Electronic Project Documentation; AACE International Transaction, Morgantown 2002; p. CD61, 8 pages.
Kennedy, Kristen; "The Incredible Shrinking Form Factor"; 2002, CRN, vol. 996, pp. 46-50.
U.S. Appl. No. 61/467,710, filed May 2, 2003, 20 pages.
Office Action dated Apr. 16, 2008 in U.S. Appl. No. 10/676,508.
Office Action dated Sep. 26, 2008 in U.S. Appl. No. 10/676,508.
International Search Report / Written Opinion dated Nov. 18, 2008 in PCT Application No. PCT/US2008/076770, 5 pages.
Office Action dated Mar. 11, 2009, in U.S. Appl. No. 10/676,508.
Office Action dated May 1, 2009 in U.S. Appl. No. 12/359,25.
Office Action dated May 27, 2009 in U.S. Appl. No. 12/359,248.
Office Action dated May 28, 2009 in U.S. Appl. No. 12/359,244.
International Search Report / Written Opinion dated Jul. 23, 2009 in PCT Application No. PCT/US2009/046402, 6 pages.
Office Action dated Oct. 15, 2009 in U.S. Appl. No. 10/676,508.
U.S. Appl. No. 61/287,071, filed Dec. 16, 2009, 24 pages.
International Search Report / Written Opinion dated Dec. 17, 2009 in PCT Application No. PCT/US2009/041951, 11 pages.
U.S. Appl. No. 61/290,391, filed Dec. 28, 2009, 19 pages.
Office Action dated Jan. 7, 2010 in U.S. Appl. No. 12/359,248.
Office Action dated Jan. 8, 2010 in U.S. Appl. No. 12/359,244.
Notice of Allowance dated Jan. 11, 2010 in U.S. Appl. No. 12/359,251.
U.S. Appl. No. 61/306,384, filed Feb. 19, 2010, 12 pages.
U.S. Appl. No. 61/323,235, filed Apr. 12, 2010, 19 pages.
U.S. Appl. No. 10/676,508, filed Sep. 30, 2003.
Office Action dated Jun. 8, 2010 in U.S. Appl. No. 12/359,244.
Office Action dated Jun. 8, 2010 in U.S. Appl. No. 12/359,248.
Office Action dated Jan. 27, 2012 in U.S. Appl. No. 12/359,248.
Notice of Allowance dated Jun. 25, 2010 in U.S. Appl. No. 10/676,508.
U.S. Appl. No. 61/435,771, filed Jan. 24, 2011, 25 pages.
"Cryptomathic: Use your mobile phone to pay for your groceries and get cash from ATMs; Scandinavian partnership launches secure payment mechanism that turns mobile phones into mobile wallets." M2 Presswire Feb. 19, 2002 ProQuest Newsstand, ProQuest. Web. Jan. 27, 2011.

(56) References Cited

OTHER PUBLICATIONS

Office Action dated Feb. 2011 in U.S. Appl. No. 12/359,248.
Notice of Allowance dated Feb. 4, 2011 in U.S. Appl. No. 12/359,244.
U.S. Appl. No. 61/466,409, filed Mar. 22, 2011, 395 pages.
U.S. Appl. No. 61/467,890, filed Mar. 25, 2011, 79 pages.
U.S. Appl. No. 61/467,969, filed Mar. 25, 2011, 90 pages.
U.S. Appl. No. 61/471,092, filed Apr. 1, 2011, 83 pages.
U.S. Appl. No. 61/485,029, filed May 11, 2011, 20 pages.
International Search Report dated Jun. 28, 2011 in PCT Application No. PCT/US2010/059299, 5 pages.
International Search Report / Written Opinion dated Aug. 24, 2011 in PCT Application No. PCT/US2010/061462, 10 pages.
U.S. Appl. No. 12/953,165, filed Nov. 23, 2010, 86 pgs.
U.S. Appl. No. 13/470,026, filed May 11, 2012, Juliene Britt, entitled: "Electronic Receipt Manager Apparatuses, Methods and Systems", 127 pages.
International Search Report / Written Opinion dated Sep. 21, 2012 in PCT Application No. PCT/US12/37597.
International Search Report / Written Opinion dated Nov. 1, 2005 in PCT Patent Application No. PCT/US2004/013850, 4 pages.
Final Office Action dated Jan. 8, 2010 in U.S. Appl. No. 12/359,244, 14 pages.
Non-Final Office Action dated Mar. 19, 2012 in U.S. Appl. No. 12/886,441, 12 pages.
Non-Final Office Action dated Jun. 21, 2012 in U.S. Appl. No. 12/359,896, 8 pages.
Final Office Action dated Jan. 18, 2013 in U.S. Appl. No. 12/359,896, 14 pages.
Notice of Allowance dated Aug. 31, 2012 in U.S. Appl. No. 12/886,441, 7 pages.
Non-Final Office Action dated Jun. 8, 2010 in U.S. Appl. No. 12/359,248, 14 pages.
Non-Final Office Action dated Jun. 21, 2011 in U.S. Appl. No. 12/359,248, 12 pages.
U.S. Appl. No. 12/359,244, filed Jan. 23, 2009.
U.S. Appl. No. 12/359,248, filed Jan. 23, 2009.
U.S. Appl. No. 12/359,251, filed Jan. 23, 2009.
U.S. Appl. No. 12/359,896, filed Jan. 26, 2009.
U.S. Appl. No. 13/849,685, filed Mar. 25, 2013.
Examination Report dated Jul. 10, 2014 in Australian Application No. 2010340176, 3 pages.

\* cited by examiner

1. I would like to receive the following types of receipts:
   - ☐ electronic
   - ☐ paper
2. I would like to receive electronic receipts by:
   - ☐ text message to my phone or PDA
   - ☐ email
   - ☐ website
3. I would like my electronic receipts in the following format(s):
   - ☐ text
   - ☐ html
   - ☐ pdf attachment
   - ☐ attachment formatted for my personal finance software
4. I would like to receive electronic receipts:
   - ☐ after each transaction
   - ☐ once a day
   - ☐ once a week
   - ☐ once a month

FIG. 6

MERCHANT ALERTS INCORPORATING RECEIPT DATA

CROSS-REFERENCES TO RELATED APPLICATIONS

The present application is a continuation application of U.S. patent application Ser. No. 12/953,178, filed on Nov. 23, 2010, which is a non-provisional application of and claims priority to U.S. Provisional Application No. 61/287,071, filed on Dec. 16, 2009, the entire contents of which are all herein incorporated by reference for all purposes.

BACKGROUND

Many different users may have different preferences for receiving receipts. For example, one person may be interested in receiving a receipt after a purchase transaction is conducted, and another may not be interested in receiving a receipt after a purchase transaction is conducted. Yet another person may be interested in receiving a particular type of receipt. For example, one person may want to receive receipts in color, whereas another person may not care if his receipts are in color.

One solution to the problem of satisfying the receipt preferences of consumers is to use electronic receipts. With electronic receipts, it is possible to do sorting, customization, etc. While electronic receipts are used in e-commerce transactions, they are not widely used in transactions conducted at brick and mortar stores.

Some stores could provide electronic receipts, however, there a number of problems with this. For example, it is costly and burdensome to have a consumer independently enroll in an electronic receipt program for each merchant patronized by the consumer. Further, even if a merchant could provide an electronic receipt, there may be some doubt in the cardholder's mind as to whether or not the receipt that is received from the merchant is accurate, especially if the merchant is not a well known and trusted merchant.

Embodiments of the invention address these and other problems individually and collectively.

BRIEF SUMMARY

Embodiments of the invention are directed to systems, apparatuses and methods for receipt programs that can be used across multiple merchants.

One embodiment of the invention is directed to system comprising a server and a consumer device in operative communication with the server. The server comprises a processor and a computer readable medium coupled to the processor. The computer readable medium comprises computer readable program code embodied therein. The computer readable program code is adapted to be executed by the processor to receive an authorization request message for a transaction conducted by a consumer with a merchant, send the authorization request message to an issuer, modify an authorization response message to include receipt preference data, and send the authorization response message comprising the receipt data to the merchant, wherein the merchant generates a receipt for the consumer according to the receipt preference data.

Another embodiment of the invention is directed to a method comprising receiving an authorization request message for a transaction conducted by a consumer with a merchant, sending the authorization request message to an issuer, modifying an authorization response message using a server computer to include receipt preference data, and sending the authorization response message comprising the receipt data to the merchant, wherein the merchant generates a receipt for the consumer according to the receipt preference data.

Another embodiment of the invention is directed to a method comprising receiving receipt data from a plurality of merchants at a central server computer, determining by the central server computer, how to process the receipt data according to receipt preference data provided by users, and providing receipts to the users according to the receipt preference data.

Another embodiment of the invention is directed to a method comprising providing receipt preference data, conducting a transaction, wherein an authorization request message is subsequently received for the transaction conducted, the authorization request message is sent to an issuer, an authorization response message is modified to include receipt preference data, and the authorization response message comprising the receipt data is sent to a merchant, wherein the merchant generates a receipt according to the receipt preference data. The method further comprises receiving a receipt in a manner consistent with the receipt preference data provided.

Another embodiment of the invention is directed to a method comprising providing receipt preference data, conducting a transaction, wherein receipt data for the transaction is subsequently received at a central server and the central server determines how to process the receipt data according to the receipt preference data, and receiving a receipt according to the receipt preference data.

Another embodiment of the invention is directed to a method comprising receiving a participation request message wherein the participation request message comprises information associated with a consumer, determining, using a server computer, whether the consumer is participating in a receipt program, and if the consumer is participating in a receipt program, sending a participation response message that includes the consumer receipt preference data.

Other embodiments of the invention are directed to computer readable media comprising code for performing the above-described methods as well as systems, apparatuses and devices that perform the methods and/or that use the computer readable medium.

These and other embodiments of the invention are described in further detail below.

BRIEF DESCRIPTION OF THE DRAWINGS

FIG. 6 shows an exemplary enrollment screen according to embodiments of the invention.

DETAILED DESCRIPTION

Figure 1A:
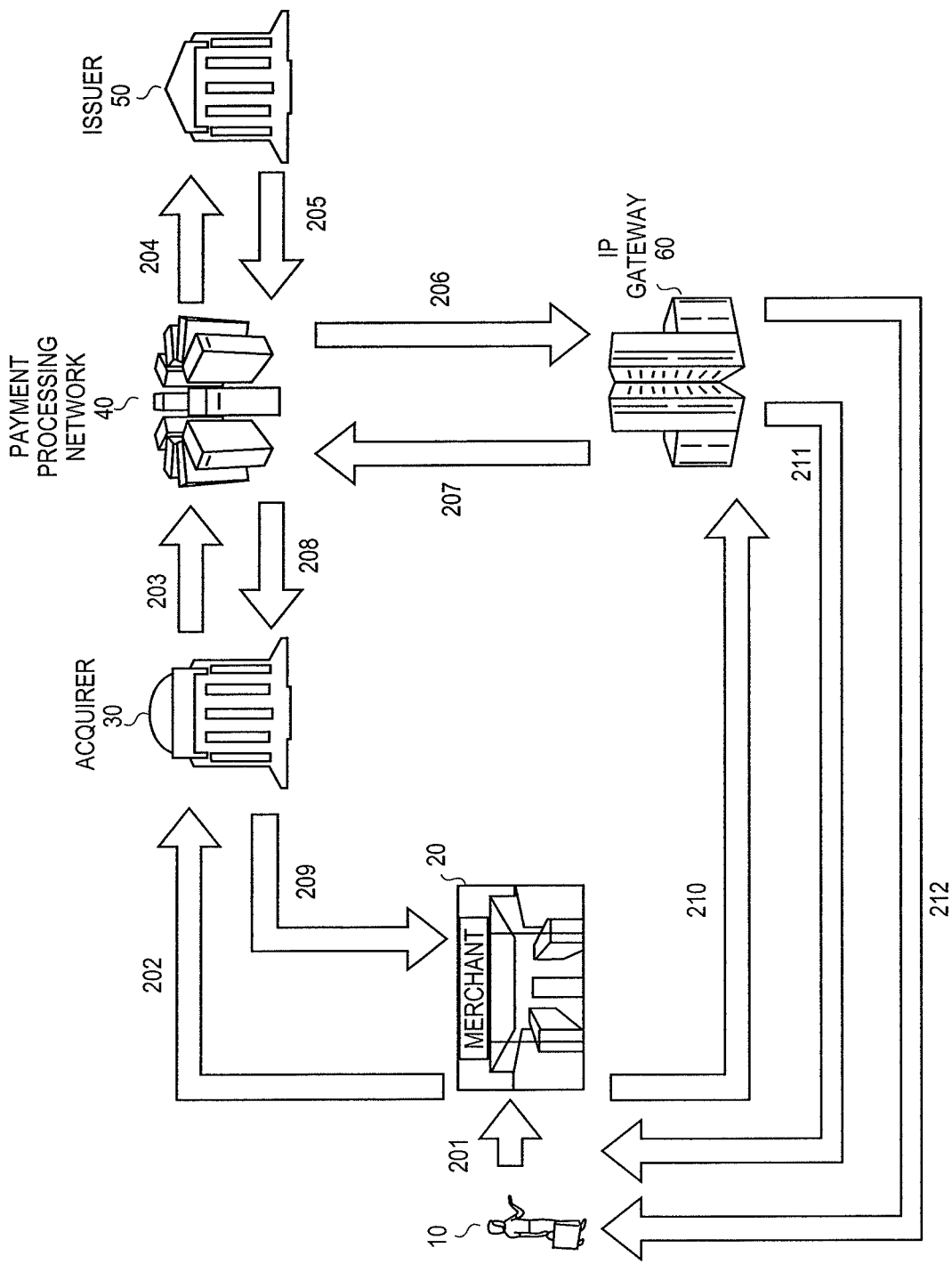
FIGS. 1A and 1B show diagrams illustrating embodiments of the invention.

Embodiments of the invention can permit a consumer to enroll in an electronic receipt program that can be used across multiple merchants, and not just a single merchant.

The electronic receipt program can be run by a central system operated by a payment processing organization that is trusted by both the users and merchants. Using the central payment processing network, a user can register her receipt preference data with the payment processing network once, instead of multiple times with multiple merchants. Merchants may also register their receipt output preferences with the central payment processing network, thereby reducing the need for the merchants to maintain the overhead associated with electronic receipts. Furthermore, in embodiments of the invention, a consumer can also receive support in case disputes arise with merchants. Merchants and others can also provide warranties using embodiments of the invention, and embodiments of the invention can also can allow for easier processing of rebates. Embodiments of the invention can also be used in conjunction with transaction alerts, which may not include SKU (stock keeping unit) data.

Using embodiments of the invention, it is also possible for the user (e.g., a consumer) to choose a particular delivery channel, format, file type, conditions for receipts, etc. For example, a user may choose to have receipts delivered on a Friday night, once a day, etc. A consumer could alternatively ask to have receipts grouped together and sent to the consumer. It is also possible to specify whether or not the consumer is only to receive electronic receipts, paper receipts, or some combination of paper receipts and/or electronic receipts under various circumstances. In another example, it is possible to decide on the conditions of the receipt and the particular form of the receipt. For example, if a consumer is buying $100 worth of coffee, then the consumer may want a receipt. Further, using embodiments of the invention, it is possible to receive receipts in Microsoft Excel™ or some other format. Any of the data used to initiate such user preferences may be included in the receipt preference data.

Embodiments of the invention can be used to service merchants and can provide a value proposition for the merchants. Merchants may need to change their existing systems, but this would be to their benefit. For example, embodiments of the invention reduce a merchant's overhead. As an illustration, embodiments of the invention reduce the amount of paper used by merchants, and can also improve customer processing speed, since delays associated with the printing of paper receipts and the replacement of printer paper in a cash register or the like would be eliminated.

In addition, because of embodiments of the invention, various potential merchants can accept payment cards in cases where paper receipts are not traditionally provided. Such merchants could not accept payment cards, because they could not provide receipts and satisfy Regulation E. Regulation E is a U.S. regulation, which requires a receipt if a cardholder uses a payment card to make a purchase. Many vending machines, phone booths, etc. do not accept payment cards, because receipts cannot be provided at such machines. Using embodiments of the invention, electronic receipts can be provided instead of paper receipts, so that embodiments of the invention can help merchants that could not previously satisfy Regulation E.

Additional details regarding embodiments of the invention are described below.

Systems and Subsystems

Figure 1B:
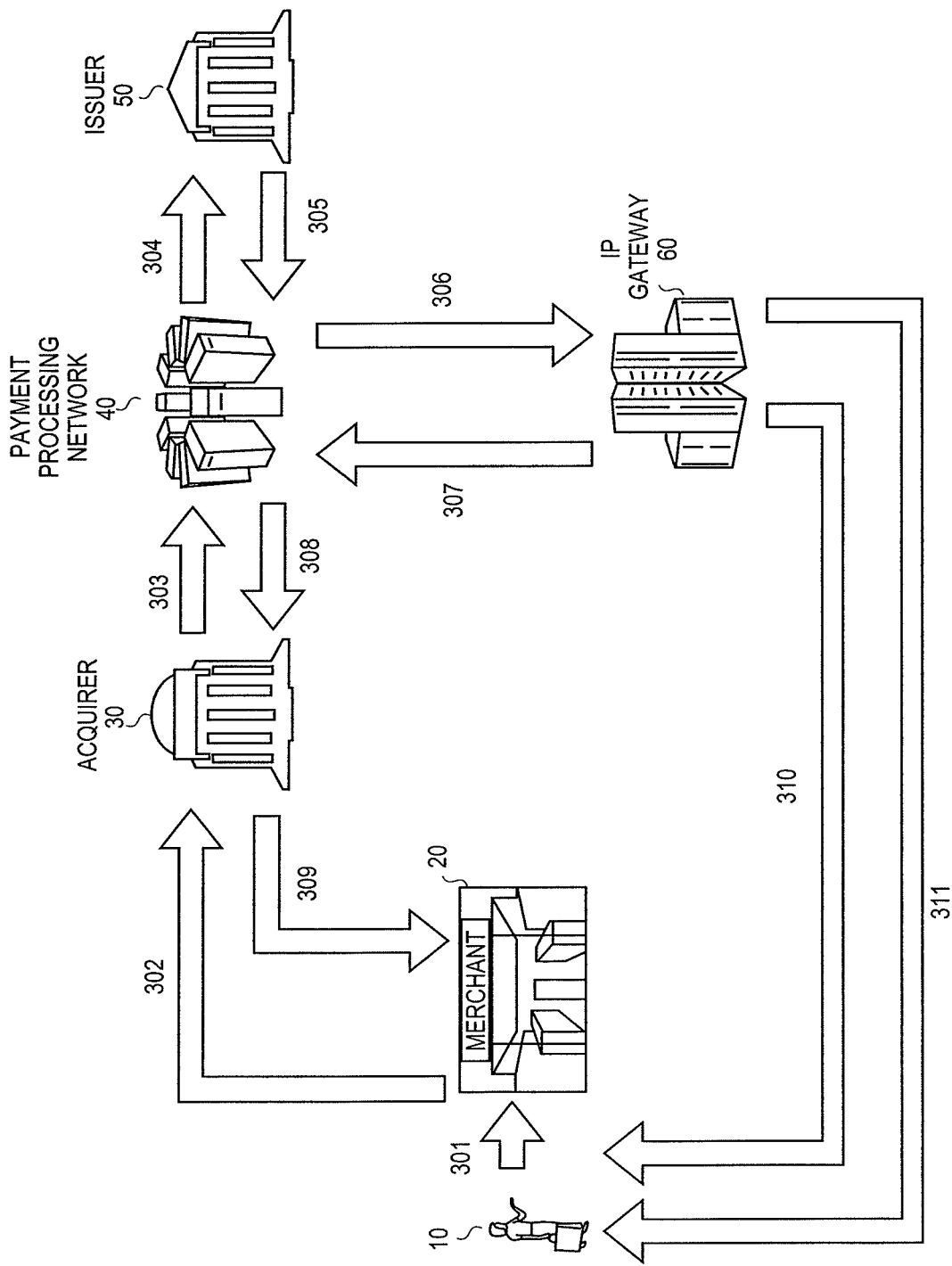

FIGS. 1A and 1B show systems that can be used in embodiments of the invention. For simplicity of illustration, one consumer 10, one merchant 20, one acquirer 30, one issuer 50 and one IP gateway 60 is shown. It is understood, however, that embodiments of the invention may include multiple consumers, merchant, acquirers, issuers, gateways, etc. In addition, some embodiments may include fewer than all of the components shown in FIGS. 1A and 1B. The components in FIGS. 1A and 1B may communication via any suitable communication medium (including the internet), using any suitable communication protocol.

The systems in FIGS. 1A and 1B include a merchant 20 and an acquirer 30 associated with the merchant 20. In a typical payment transaction, a consumer 10 may purchase goods or services at the merchant 20 using a portable consumer device. The acquirer 30 can communication with an issuer 50 via a payment processing network 40.

The acquirer 30 is typically a bank that has a merchant account. The issuer 50 may also be a bank, but could also be a business entity such as a retail store. Some entities are both acquirers and issuers, and embodiments of the invention include such entities. The issuer 50 and an acquirer 30 may each operate a server computer which may have a computer readable medium comprising code for performing functions that the issuer 50 or the acquirer 30 performs. A database comprising account number information and other information may be operatively coupled to the server computer.

The consumer 10 may be an individual, or an organization such as a business that is capable of purchasing goods or services.

The merchant 20 may be an individual or an organization such as a business that is capable of providing goods and services. The merchant 20 may have a computer apparatus (not shown). The computer apparatus may comprise a processor and a computer readable medium. The computer readable medium may comprise code or instructions for performing the functions of the merchant 20.

The merchant 20 may also have, or may receive communications from, an access device that can interact with the portable consumer device. The access device may be located at the merchant 20 or it could be located at any other suitable location in other embodiments of the invention. The access devices according to embodiments of the invention can be in any suitable form. Examples of access devices include point of sale (POS) devices, cellular or mobile phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, and the like.

If the access device is a point of sale terminal, any suitable point of sale terminal may include a reader, a processor and a computer readable medium. The reader may include any suitable contact or contactless mode of operation. For example, exemplary card readers can include RF (radio frequency) antennas, magnetic stripe readers, etc. to interact with the portable consumer device.

The portable consumer device (not shown) may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular or mobile phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Figure 2:
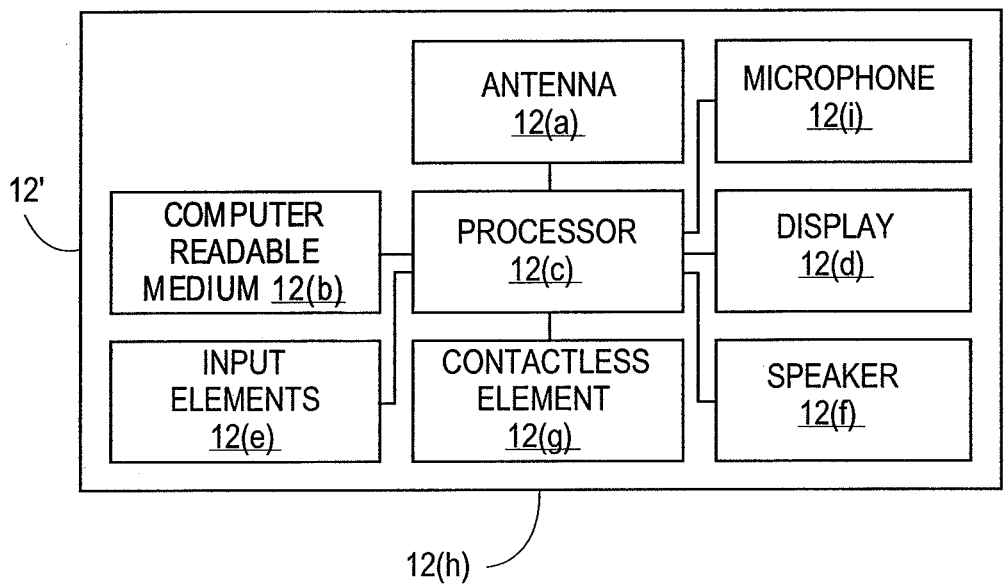
FIGS. 2-3 show diagrams of portable consumer devices.

Portable consumer devices may be used to initiate the transactions at the merchant and/or receive receipts and/or alerts. FIG. 2 shows a block diagram of a portable consumer device in the form of a phone 12' that can be used in embodiments of the invention. The exemplary wireless phone 12' may comprise a computer readable medium and a body as shown in FIG. 2. The computer readable medium 12(b) may be present within the body 12(h), or may be detachable from it. The body 12(h) may be in the form a plastic substrate, housing, or other structure. The computer readable medium 12(b) may be in the form of (or may be included in) a memory that stores data (e.g., data relating to issuer specific payment services) and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, a bank identification number (BIN), credit or debit card number information, account balance information, expiration date, user information such as name, date of birth, etc. Any of this information may be transmitted by the phone 12'.

In some embodiments, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The phone 12' may further include a contactless element 12(g), which is typically implemented in the form of a semiconductor chip (or other data storage element) with an associated wireless transfer (e.g., data transmission) element, such as an antenna. Contactless element 12(g) is associated with (e.g., embedded within) phone 12' and data or control instructions transmitted via a cellular network may be applied to contactless element 12(g) by means of a contactless element interface (not shown). The contactless element interface functions to permit the exchange of data and/or control instructions between the mobile device circuitry (and hence the cellular network) and an optional contactless element 12(g).

Contactless element 12(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 12' and an interrogation device. Thus, the phone 12' is capable of communicating and transferring data and/or control instructions via both cellular network and near field communications capability.

The phone 12' may also include a processor 12(c) (e.g., a microprocessor) for processing the functions of the phone 12' and a display 12(d) to allow a user to see phone numbers and other information and messages. The phone 12' may further include input elements 12(e) to allow a user to input information into the device, a speaker 12(f) to allow the user to hear voice communication, music, etc., and a microphone 12(i) to allow the user to transmit her voice through the phone 12'. The phone 12' may also include an antenna 12(a) for wireless data transfer (e.g., data transmission).

Figure 3:
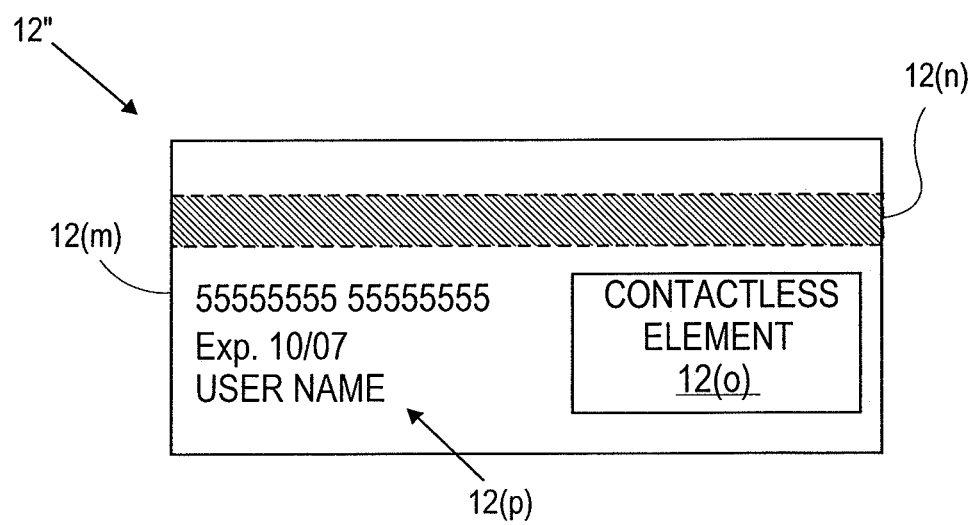

An example of a portable consumer device 12" in the form of a card is shown in FIG. 3. FIG. 3 shows a plastic substrate 12(m). A contactless element 12(o) for interfacing with an access device may be present on or embedded within the plastic substrate 12(m). User information 12(p) such as an account number, expiration date, and user name may be printed or embossed on the card. Further, a magnetic stripe 12(n) may also be on the plastic substrate 12(m). The portable consumer device 12" may also comprise a microprocessor and/or memory chips with user data stored in them.

As shown in FIG. 3, the portable consumer device 12" may include both a magnetic stripe 12(n) and a contactless element 12(o). In other embodiments, both the magnetic stripe 12(n) and the contactless element 12(o) may be in the portable consumer device 12". In other embodiments, either the magnetic stripe 12(n) or the contactless element 12(o) may be present in the portable consumer device 12".

Referring again to FIGS. 1A and 1B, the payment processing network 40 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 40 may include a server computer which may have computer readable medium comprising code for performing functions that a payment processing network 40 performs. A "server computer" or "server" is typically a powerful computer or cluster of computers. For example, the server computer can be a large mainframe, a minicomputer cluster, or a group of servers functioning as a unit. In one example, the server computer may be a database server coupled to a Web server. The payment processing network 40 may use any suitable wired or wireless network, including the Internet. One or more databases may be operatively coupled to the server computer.

IP (Internet protocol) gateway 60 refers to an entity that generates and delivers receipts to various delivery channels. IP gateway 60 may also provide other functions such as generating and delivering notifications and alert messages to various delivery channels and receiving alert messages from various channels. IP gateway 60 may be in operative communication with consumer 10, merchant 20, acquirer 30, and payment processing network 40. In one embodiment the IP gateway 60 may be separated from the payment processing network 40 as shown in FIGS. 1A and 1B. In other embodiments the IP gateway 60 may be part of the payment processing network 40 or some parts of the IP gateway 60 may be part of the payment processing network 40.

Figure 5:
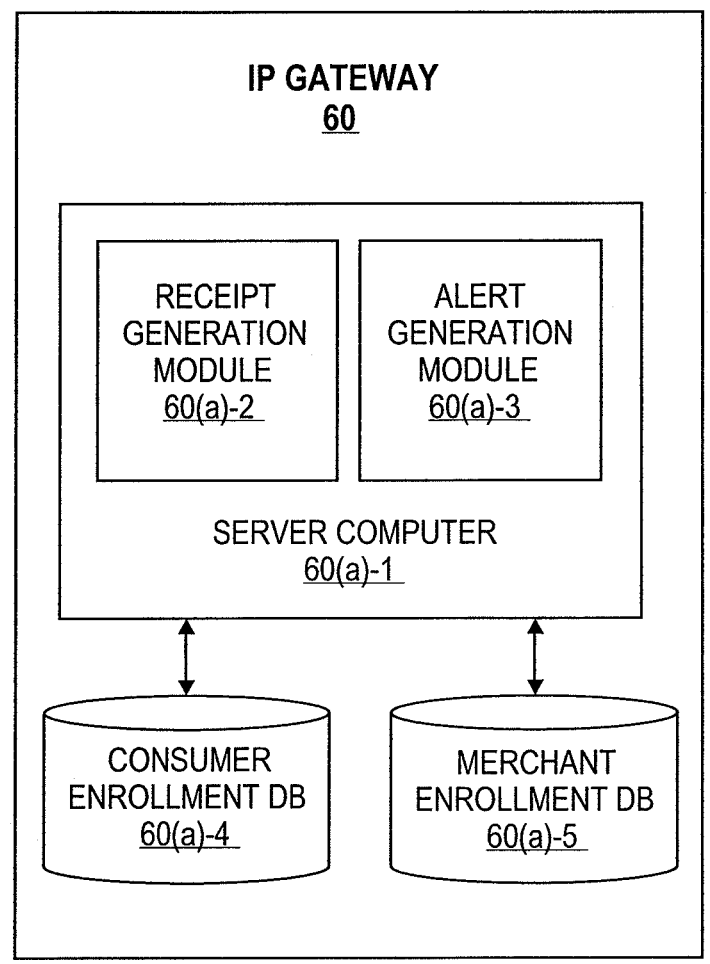
FIG. 5 shows a block diagram of an IP Gateway according to embodiments of the invention.

IP gateway 60 may comprise a server computer and various databases coupled to the server computer as shown in FIG. 5. In some embodiments, one or more databases may be included in the server computer. The server computer may be a powerful computer or cluster of computers. For example, the server computer can be a large mainframe, a minicomputer cluster, or a group of servers functioning as a unit. The server computer 60(a)-1 may comprise a receipt generation module 60(a)-2 and an alert generation module 60(a)-3. The components running on the server computer 60(a)-1 may be embodied by computer code or software that is stored on a computer readable medium and is executable by a processor in the server computer 60(a)-1. The computer readable medium may comprise code or instructions for performing the functions of the IP gateway 60. For example, the computer code or software may cause the processor to perform a method including receiving a transaction participation request message wherein the transaction request message comprises information associated with a consumer, determining whether the consumer is participating in a receipt program, and if the consumer is participating in a receipt program, sending a participation response message that includes the consumer receipt preference data.

A consumer enrollment database 60(a)-4 may comprise data related to users who are enrolled in an electronic receipt program (e.g., enrollment preferences and other information). A merchant enrollment database 60(a)-5 may comprise data related to merchant receipt preferences and other information.

Figure 4:
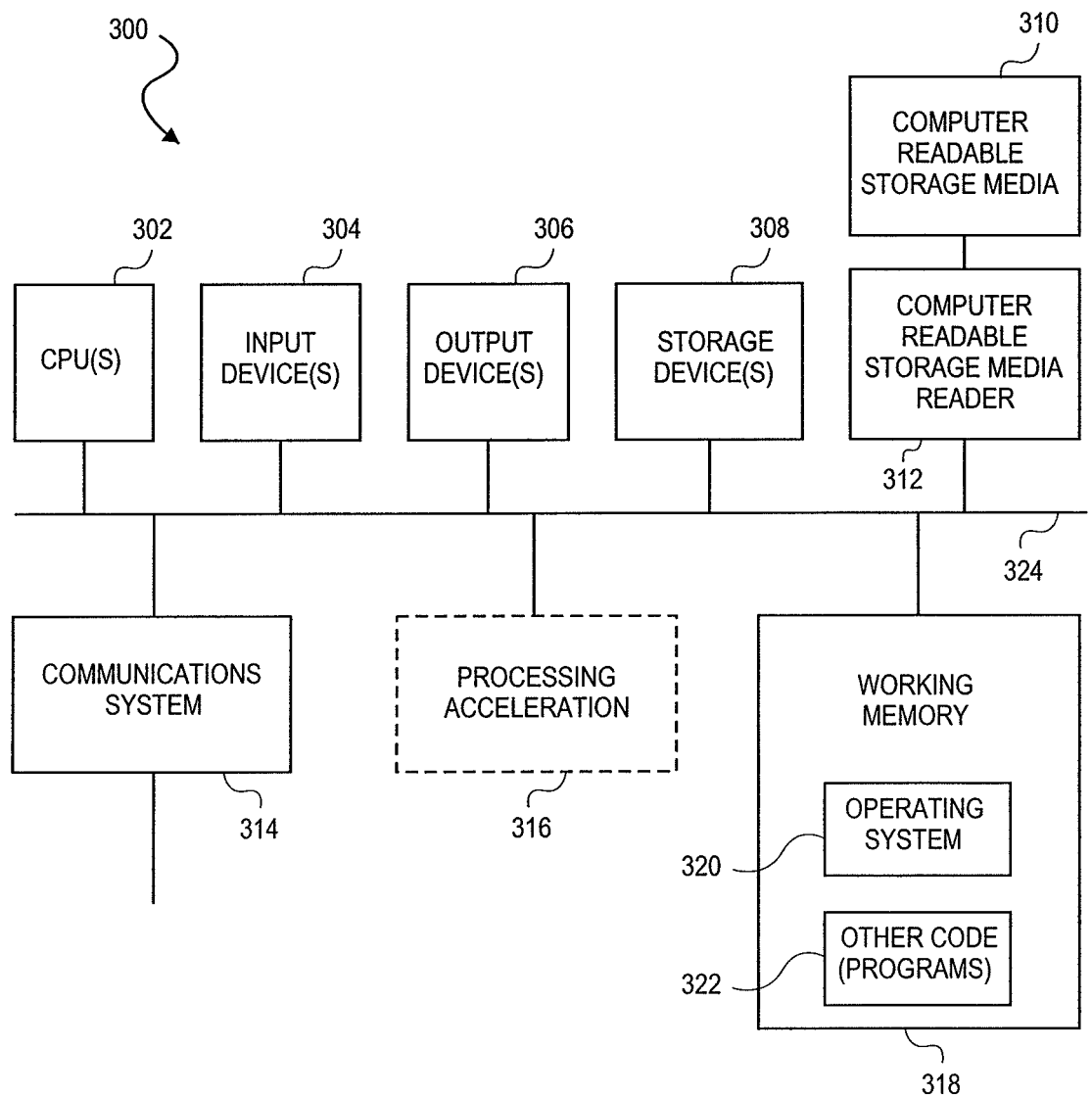
FIG. 4 shows a block diagram of a computer apparatus.

The various participants and elements (e.g., the merchant, the acquirer, the payment processing network, the issuer, and the IP gateway) in FIGS. 1A and 1B may also operate one or more computer apparatuses (e.g., a server computer) to facilitate the functions described herein. Any of the elements in FIGS. 1A and 1B may use any suitable number of subsystems to facilitate the functions described herein. Examples of such subsystems or components are shown in FIG. 4. FIG. 4 illustrates an exemplary computer system 300, in which various embodiments may be implemented. The system 300 may be used to implement any of the computer systems described above (e.g., merchant computer apparatus, acquirer server, issuer server, payment processing server, IP gateway server, etc.). The computer system 300 is shown comprising hardware elements that may be electrically coupled via a bus 324. The hardware elements may include one or more central processing units (CPUs) 302, one or more input devices 304 (e.g., a mouse, a keyboard, etc.), and one or more output devices 306 (e.g., a display device, a printer, etc.). The computer system 300 may also include one or more storage devices 308. By way of example, the storage device(s) 308 can include devices such as disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 312, a communications system 314 (e.g., a modem, a network card (wireless or wired), an infra-red communication device, etc.), and working memory 318, which may include RAM and ROM devices as described above. In some embodiments, the computer system 300 may also include a processing acceleration unit 316, which can include a digital signal processor DSP, a special-purpose processor, and/or the like.

The computer-readable storage media reader 312 can further be connected to a computer-readable storage medium 310, together (and, optionally, in combination with storage device(s) 308) comprehensively representing remote, local, fixed, and/or removable storage devices plus storage media for temporarily and/or more permanently containing, storing, transmitting, and retrieving computer-readable information. The communications system 314 may permit data to be exchanged with the network and/or any other computer described above with respect to the system 300.

The computer system 300 may also comprise software elements, shown as being currently located within a working memory 318, including an operating system 320 and/or other code 322, such as an application program (which may be a client application, Web browser, mid-tier application, RDBMS, etc.). It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In a typical purchase transaction, the consumer 10 purchases a good or service at the merchant 20 using a portable consumer device such as a credit card. The consumer's portable consumer device can interact with an access device such as a POS (point of sale) terminal at the merchant 20. For example, the consumer 10 may take a credit card and may swipe it through an appropriate slot in the POS terminal. Alternatively, the POS terminal may be a contactless reader, and the portable consumer device may be a contactless device such as a contactless card.

An authorization request message is then forwarded to the acquirer 30. After receiving the authorization request message, the authorization request message is then sent to the payment processing network 40. The payment processing network 40 then forwards the authorization request message to the issuer 50 of the portable consumer device.

After the issuer 50 receives the authorization request message, the issuer 50 sends an authorization response message back to the payment processing network 40 to indicate whether or not the current transaction is authorized. The payment processing network 40 then forwards the authorization response message back to the acquirer 30. The acquirer 30 then sends the response message back to the merchant 20.

After the merchant 20 receives the authorization response message, the access device at the merchant 20 may then provide the authorization response message for the consumer 10. The response message may be displayed by the access device or the portable consumer device, or may be printed out on a receipt.

At the end of the day, a normal clearing and settlement process can be conducted by the payment processing network 40. A clearing process is a process of exchanging financial details between and acquirer and an issuer to facilitate posting to a consumer's account and reconciliation of the consumer's settlement position.

Some of the embodiments described below may use a payment processing system like the one described above, or any suitable combination of components in the payment processing system.

Enrollment

There may be a variety of ways in which the consumer 10 may become enrolled in a receipt program. For example, the consumer 10 may enroll through a payment processing network 40, an issuer 50, or even through a merchant 20. In some embodiments, the consumer 10 may be enrolled automatically by the issuer 50 that issues the portable consumer device. Enrollment may also be done in batch mode, by file delivery from issuer 50 or by file delivery from some other party. In other embodiments, the issuer 50 or payment processing network 40 may provide the receipt service as an option to the consumer 10 at which time the consumer 10 may enroll in the receipt service either by contacting a customer service representative over the phone (provided by either the issuer 50 or payment processing network 40), or by accessing a website and filling out an online application. In certain implementations the website may be hosted by one entity but can redirect the consumer to a site hosted by another entity. An exemplary screen that may be used by the consumer 10 to enroll in a receipts service is shown in FIG. 6.

During enrollment, a consumer 10 may choose preferences for receiving receipts. For example, the consumer 10 may choose one or more of a particular delivery channel, format, file type, conditions for receipts, etc. For example, the consumer 10 may want to receive receipts via his mobile phone, personal digital assistant (PDA), personal computer, and/or other similar devices. The consumer 10 may want to receive receipt in Microsoft Excel or some other format (e.g., a format compatible with a consumer's financial software). The consumer 10 may specify conditions for receipts. For example, the consumer 10 may choose to have receipts delivered according to a particular predetermined frequency, such as after each transaction, once a day, once a week, once a month, etc. The consumer 10 may specify a type of receipt based on a transaction amount. For example, the consumer 10 may not want to receive a paper receipt for any transaction under $100. Or, the consumer 10 may want to only receive receipts for business expenses. The consumer 10 may want to receive both a paper and electronic receipt for merchandise that has a warranty or maintenance on it such as merchandise form an electronic store or an appliance store. The consumer 10 may also specify whether or not he wants to receive offers and/or coupons along with his receipt. The consumer 10 may also specify that he wants information regarding reward points included with his receipts.

The consumer 10 may also request a weekly or monthly consolidated report of his receipts/transaction. The consolidated report may include SKU level details of the consumer's purchases. The consumer 10 may request the consolidated reports be delivered electronically or in paper form. The consumer 10 may also specify that he wants a consolidated report by merchant. A consumer 10 may also specify that he would like the consolidated receipt printed at the merchant store. For example, a consumer 10 may go to his local coffee shop several days a week. He may request to get a consolidated receipt at the end of every week when he visits the coffee shop. At the end of each week when he makes his purchase at the coffee shop, he may get a receipt for that purchase and then also get a paper copy of his consolidated receipt with all of his purchases at the coffee shop for the week. In the alternative, the consumer 10 may specify that he does not want any individual receipts, and just wants the consolidated receipt at the end of the week.

In yet other embodiments, different consumer preferences may be associated with different merchants. For example, a consumer may not wish to receive a receipt for a purchase of gasoline at a gas station, but may want receipts at grocery stores. As will be explained in further detail below, in some embodiments of the invention, an authorization request message may include a merchant category code so that consumer preferences can be tailored to specific purchases at specific merchants in real time.

A consumer 10 may also specify that he would like multiple receipts delivered. For example, the consumer 10 and his spouse may each want a copy of the receipt. In another example, the consumer 10 may have a small business and may want one copy of the receipt delivered to him and another copy of the receipt delivered to the accounting department of his business.

A consumer 10 can also specify that he would like the receipt signed or encrypted. For example, a consumer 10 may not want other people who may have access to his account to be able to view or access all or some of his receipts and may set a password that is required to open the receipts. For example, a consumer 10 and his spouse may both have access to the same email account. The consumer 10 may buy a gift for his spouse and not want his spouse to be able to view the receipt. The spouse would not be able to access the receipt without a password.

A consumer 10 may also have the ability to initiate a chargeback after he receives an electronic receipt. For example, he may reserve a hotel room for 3 nights and then cancel the week before. A receipt showing that the hotel charged him for the room the next week (even though he canceled) may be sent to him in electronic form. Typically, the process to initiate a chargeback or dispute process is very cumbersome. The consumer 10 would have to call the hotel to dispute the charge, maybe bring in a copy of the receipt in person to show the hotel what happened, etc. Or, the consumer 10 may have to call his credit card company, and fill out forms or talk to a customer representative to pursue a dispute. With the electronic receipts, however, the receipt may include an embedded link to contact the merchant hotel directly to dispute the charge and a separate embedded link to start the dispute process directly with the issuer of his payment card. These links may take the consumer 10 to a form that where the relevant information from the receipt is already filled out and all the consumer 10 has to do is verify the information and submit the form.

Instead of or in addition to providing consolidated reports or individual receipts to a consumer 10, receipt data may be provided via application content or a website. For example, a consumer 10 may log into a website (e.g., www.myreceipts.com) to access all of his receipt data. The consumer 10 may be able to see individual receipts on the website or generate reports from the data. The consumer 10 may be able to sort receipts, export receipts, print receipts, etc. The website may provide various tools such as a rebate generator or a the ability to register a warranty for a particular transaction, the ability to share data with social networking sites, etc. There could also be related information for a transaction such as a flag that notifies the consumer 10 if there has been any product recalls for any products he has purchased. There may also be some marketing aspects of the website such as recommendations for similar or complementary items to the items that the consumer 10 has purchased.

Optionally, merchants may also enroll or register their receipt output preferences. Merchants may become enrolled or register their receipt output preferences through a payment processing network 40, an acquirer 30, or an issuer 50. Enrollment may be done in batch mode, by file delivery from an acquirer 30, issuer 50, or some other party. In some embodiments, a website can be provided for the merchant to enroll and register their output preferences.

Figure 9:
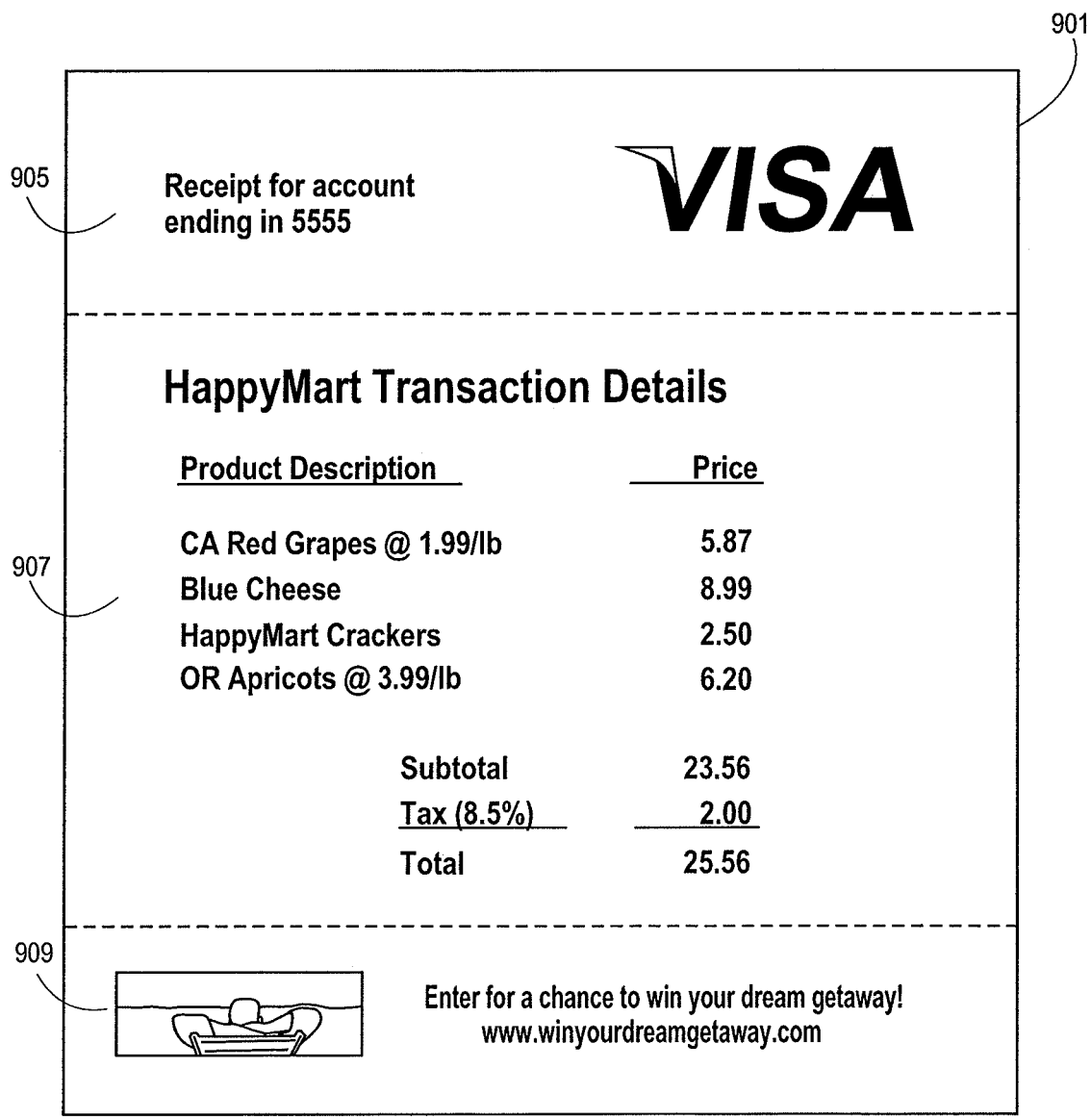
FIG. 9 shows an exemplary receipt according to embodiments of the invention.

In one embodiment, a receipt format may be created automatically for the merchant 20 without any need for merchant 20 input or preferences. In another embodiment a template may be provided to a merchant 20 to use to specify what the merchant 20 would like to see in its receipts. The template may be provided by a payment processing network 40, an acquirer 30, or an issuer 50. An exemplary receipt 901 is shown in FIG. 9. The top section 905 of the receipt may have account information and the issuer or payment processing information. The middle section 907 may have transaction details for the purchase at a particular merchant 20. The bottom section 909 may have an area for various types of messaging (e.g., advertisements, offers, coupons, rebate or warranty information related to the transaction, etc.). A merchant 20 may provide preferences for what information should appear in each section, and the format and appearance of each section. For example, a merchant "HappyMart" may specify that it wants the transaction details to appear as shown in section 907 of FIG. 9 and that these should be in black and white. It may also specify that it wants particular offers to be shown in section 909 in color and it will provide the offers on a weekly or monthly basis. This would be the standard template for HappyMart until it provided an updated or new template. Each merchant may have completely different preferences on the format for the receipt, the graphics and placement of graphics, colors, etc. Some merchants may have more than one template depending on the type of receipt or transaction (for example). This illustrates the degree of flexibility an customization of receipts. Those skilled in the art will understand that these embodiments are illustrative and not restrictive.

Processing and Generating Receipts

Methods according to embodiments of the invention can be described with reference to FIGS. 7-8 with reference to FIGS. 1A, 1B, and 5. It is understood that the steps described in the methods described in FIGS. 7-8 can be performed in any suitable order and are not limited to the specific orders shown in the figures.

Figure 7:
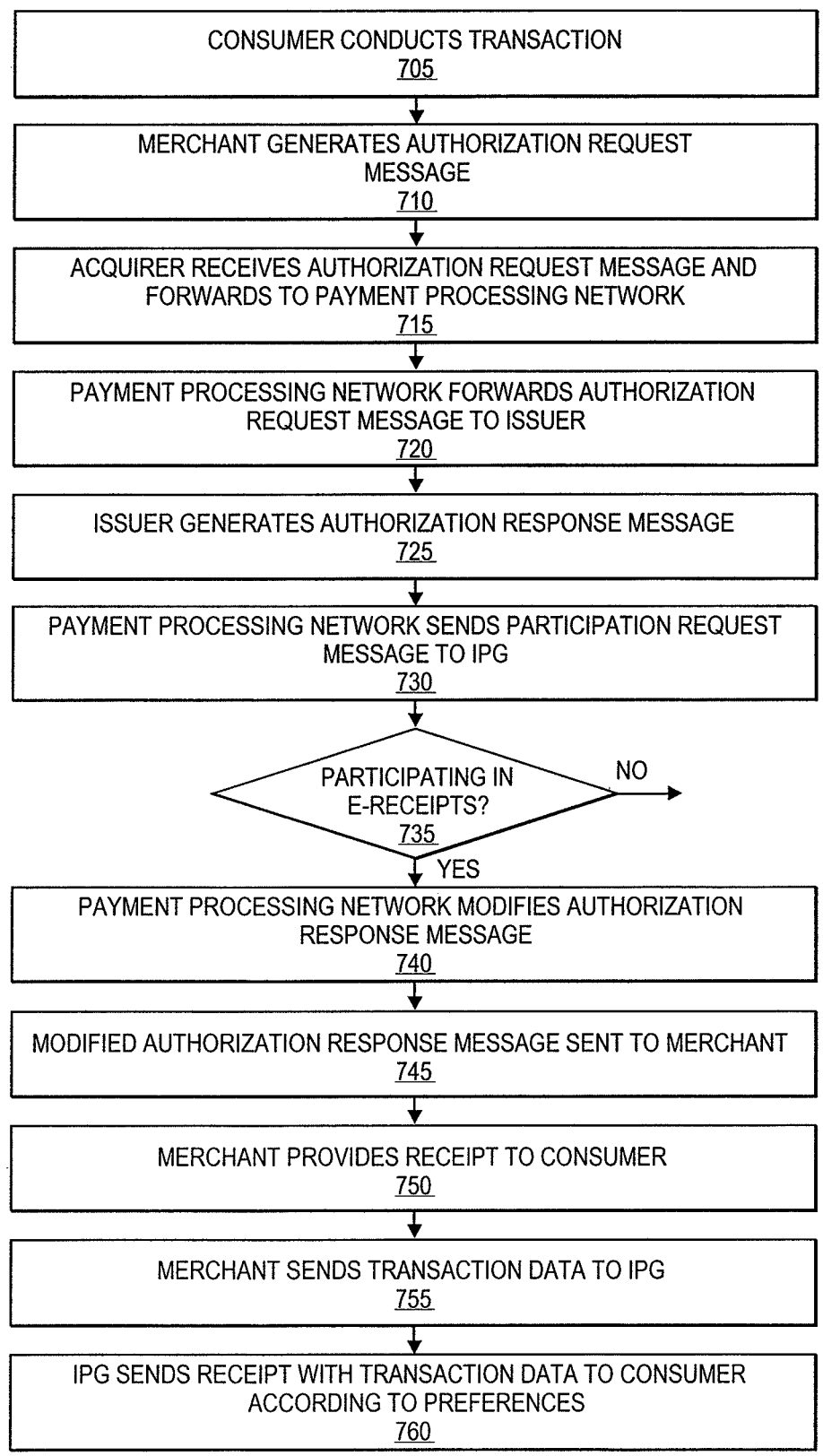
FIGS. 7-8 show flowcharts illustrating steps in a method according to embodiments of the invention.

FIG. 7 shows a flowchart including a general method according to an embodiment of the invention. The method can be described with reference to the block diagram in FIG. 1A which shows an embodiment of the invention where receipt data is provided to a payment processing network outside of the messaging channels associated with an ordinary payment card transaction (e.g., out of band). For example, receipt data may be provided after a transaction occurs.

In a typical transaction a consumer 10 conducts a transaction (step 705 and arrow 201 in FIG. 1A). For example a consumer 10 may visit a merchant website to conduct a purchase. In another example, a consumer 10 may enter a merchant store to conduct a purchase. Using this example, the consumer 10 makes the purchase at an access device (e.g., a point of sale terminal) at the merchant 20 using a portable consumer device such as a credit or debit card, the access device generates an authorization request message (step 710) which may include information such as the transaction amount, cared verification value, service code, expiration date, merchant category code, an account number, and other information. This authorization request message is then sent to the acquirer 30 (arrow 202 in FIG. 1A). After the acquirer 30 receives the authorization request message, it is then forwarded to a payment processing network 40 (step 715 and arrow 203 in FIG. 1A). The authorization request message is then forwarded by the payment processing network 40 to the issuer 50 (step 720 and arrow 204 in FIG. 1A). The issuer 50 (or a computer apparatus at the issuer) may then authorize or decline the transaction. The transaction may be approved or declined due to a number of factors (e.g., the creditworthiness of the consumer, the risk of fraud, etc). In step 725, the issuer 50 generates an authorization response message and sends this back to the payment processing network 40 (arrow 205 of FIG. 1A).

The payment processing network 40 (or a server computer therein) then sends a transaction participation information request message to an IP gateway 60 (step 730 and arrow 206 in FIG. 1A). The IP gateway 60 determines whether or not the consumer is participating in a receipt program (step 735). For example, the IP gateway 60 may check a consumer enrollment database 60(a)-4 to see if the consumer 10 is participating in a receipt program. If the consumer 10 is not participating in a receipt program, then the IP gateway 60 returns a message indicating that the consumer 10 is not participating (arrow 207 in FIG. 1A). The payment processing network 40 proceeds with processing the transaction like any typical transaction.

If the IP gateway 60 determines that the consumer 10 is participating in a receipt program, the IP gateway 60 may then check a merchant enrollment database 60(a)-5 to determine whether the merchant 20 has any receipt preferences. The IP gateway 60 sends a participation information response message to the payment processing network 40 with receipt preferences (arrow 207 in FIG. 1A). The payment processing network 40 modifies the authorization response message to include the receipt preference data (step 740). For example, fields available as part of a normal authorization response message may be utilized to include the receipt preference data. For example, open characters available a the field or flags available in the response message may be utilized, or existing fields could be repurposed. The receipt preference data may include, for example, the type of receipt desired by the consumer 10, the conditions of receipt delivery, data regarding the merchant's preferences, etc. The modified authorization response message is sent to the acquirer 30 (arrow 208 in FIG. 1A).

The modified authorization response message is then sent from the acquirer 30 to the merchant 20 (step 745 and arrow 209 in FIG. 1A). Using the received receipt preference data, the merchant 20 knows what type of receipt the consumer 10 prefers to receive (e.g., paper, e-receipt, or both), and the merchant's access device can provide the receipt to the consumer 10 in the desired format (e.g., paper, bundled, electronic, etc.).

In some embodiments, the receipt preference data may in the form of a code which includes a number of sub-codes, the latter of which may correspond to the way in which receipts are printed, the type of data that is to be provided on a receipt, manner in which the receipt is to be delivered, etc. For example, a code such as 112233 may include a subcode 11 which may indicate that that the receipt is to be printed in large font, the subcode 22 may indicate that advertisements suitable for the consumer may be printed on the receipt, and subcode 33 may indicate that the receipt should be displayed on a display associated with the merchant's access device, and sent to the consumer's e-mail address, but is not supposed to be printed on paper. A computer processor in the access device or otherwise at the merchant can recognize the code and can provide the receipt to the consumer in the manner preferred by the consumer.

In some embodiments, the receipt preference data may be a binary implementation. For example, a 16-bit implementation could be utilized where each bit corresponds to different receipt preference data. As an example, bit 1 may indicate that the consumer 10 is participating in the receipt program, bit 2 may indicate that the consumer 10 desires a paper receipt, bit 3 may indicate that a consumer 10 desires both an electronic and paper receipt, bit 4 may indicate that consumer 10 would like the receipt data available on a website, bit 5 on may indicate that the consumer 10 desires to receive an alert, bit 6 may indicate that a consumer 10 may desire to receive promotional information, etc. Thus, if the receipt preference data includes the following: 101001 . . . , it may indicate that the consumer 10 is participating in the receipt program (bit 1 is "on"), desires both an electronic and paper receipt (bit 3 is "on"), and desires to receive promotional information (bit 6 is "on").

Further, in some embodiments, a merchant 20 may work with a third party that provides receipt management and inventory control. If so, the receipt preference data may be sent to the third-party to provide the receipt to the consumer 10.

Optionally, an alert message may be sent from the IP gateway 60 to the consumer 10 (or more specifically, to the consumer's consumer device (e.g., a mobile phone or portable computer)) (arrow 212 in FIG. 1A). The alert message may be sent during the transaction or immediately after the transaction or at another time according to consumer preferences. In some embodiments, the delivery of receipts can be different than transaction alert information. For example, an electronic receipt may have SKU level data, and other data that is provided by the merchant 20, whereas transaction alert messages may not have this information. An alert message may optionally include a transaction ID (identification). The transaction ID may be used to make a return regardless of whether the consumer 10 has a full receipt for the transaction. For example the merchant 20 can put the transaction ID into its system and pull up the transaction details for that transaction. The transaction ID may be a number or may be in the form of a bar code or a two dimensional bar code.

At the end of the day or at some other time (during the transaction or immediately after the transaction), the merchant 20 may send SKU data for the transaction and other transactions to the IP gateway 60, out of band (step 755 and arrow 210 in FIG. 1A). In the alternative an acquirer 30 may sent SKU data for transaction related to one or more merchants. The SKU data may be sent for each individual transaction or may be sent together in a batch. The SKU data may be sent after a transaction occurs, at various times throughout the day, or at the end of the day. Once the IP gateway 60 receives the SKU data, receipts can be delivered to the consumer 10 in the manner preferred by the consumer 10 (step 760 and arrow 211 in FIG. 1A). The receipts may be delivered in a particular format that is preferred by a consumer, and in a particular manner. For example, the consumer 10 may wish to have all of his receipts delivered to his home e-mail address in a particular format such as a PDF format or in a spreadsheet format.

Figure 8:
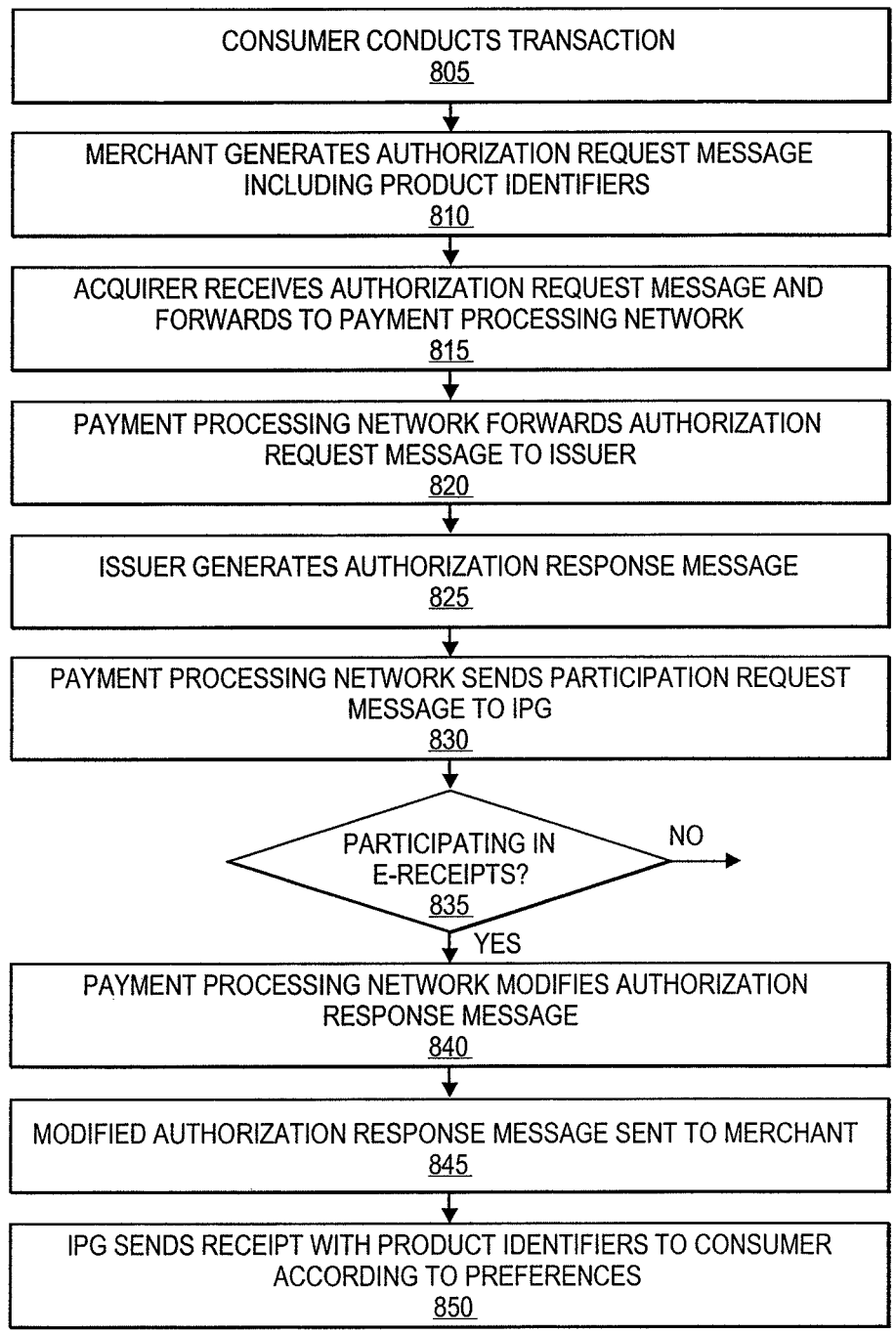

FIG. 8 shows a flowchart including a general method according to an embodiment of the invention. The method can be described with reference to the block diagram in FIG. 1B which shows an embodiment of the invention where receipt data is provided to a payment processing network inside of the messaging channels associated with an ordinary payment card transaction (e.g., in band). For example, receipt data may be provided while a transaction is occurring.

In a typical transaction, a consumer 10 conducts a transaction (step 805 and arrow 301 in FIG. 1B). For example a consumer 10 may visit a merchant website to conduct a purchase. In another example, a consumer 10 may enter a merchant store to conduct a purchase. Using this example, after the consumer 10 makes a purchase at an access device (e.g., a point of sale terminal) at the merchant 20, the access device generates an authorization request message which may include information such as the transaction amount, merchant category code, an account number. The authorization request message is sent to the acquirer 30 (step 810 and arrow 302 in FIG. 1B). The authorization request message may comprise product identifiers (e.g., SKU data) associated with the transaction. After the acquirer 30 receives the authorization request message, it is then forwarded to a payment processing network 40 (step 815 and arrow 303 in FIG. 1B). The authorization request message is then forwarded by the payment processing network 40 to the issuer 50 (step 820 and arrow 304 in FIG. 1B). The issuer 50 (or a computer apparatus at the issuer) may then authorize or decline the transaction. The transaction may be approved or declined due to a number of factors (e.g., the creditworthiness of the consumer, the risk of fraud, etc.).

In step 825, the issuer 50 generates an authorization response message and sends this back to the payment processing network 40 (arrow 305 in FIG. 1B). The payment processing network 40 then sends a participation request message to an IP gateway 60 (step 830 and arrow 306 in FIG. 1B). In step 835, the IP gateway 60 sends a participation response message to the payment processing network 40 (arrow 307 in FIG. 1B) with an indication (e.g., a participation flag) as to whether or not the consumer 10 is enrolled in the receipt service. For example, the IP gateway 60 may check a consumer enrollment database 60(*a*)-4 to see if the consumer 10 is participating in a receipt program. If the consumer 10 is not participating in the receipt program, then the IP gateway 60 returns a message indicating that the consumer 10 is not participating. The payment processing network 40 proceeds with processing the transaction like any typical transaction.

If the IP gateway 60 determines that the consumer 10 is participating in a receipt program, the IP gateway 60 may then check a merchant enrollment database 60(*a*)-5 to determine whether the merchant 20 has any receipt preferences. The IP gateway 60 sends a participation information response message to the payment processing network 40 with receipt preferences. The payment processing network 40 then modifies the authorization response message to include the receipt preference data (step 840), and the modified authorization response message is sent to the acquirer 30 (arrow 308 in FIG. 1B). The receipt preference data may include, for example, the type of receipt desired by the consumer 10, the conditions of receipt delivery, data regarding the merchant's preferences, etc. The modified authorization response message is then sent from the acquirer 30 to the merchant 20 (step 845 and arrow 309 in FIG. 1B). Using the received receipt preference data, the merchant knows what type of receipt the consumer prefers to receive (e.g., paper, e-receipt, or both), and can provide the receipt to the user according to the user's preferences. A merchant 20 may work with a third party that provides receipt management and inventory control. If so, the receipt preference data may be sent to the third-party to provide the receipt to the consumer 10.

An alert message may be optionally sent from the IP gateway 60 to the consumer (or more specifically, to the consumer's consumer device such as a mobile phone or portable computer) (arrow 311 in FIG. 1B). The alert may be sent during the transaction or immediately after the transaction or at another time according to consumer preferences. In some embodiments, the delivery of receipts can be different than transaction alert information. For example, an electronic receipt may have SKU level data, and other data that is provided by the merchant 20, whereas transaction alert messages may not have this information. An alert message may optionally include a transaction ID (identification). The transaction ID may be used to make a return regardless of whether the consumer 10 has a full receipt for the transaction. For example the merchant 20 can put the transaction ID into its system and pull up the transaction details for that transaction. The transaction ID may be a number or may be in the form of a bar code or a two dimensional bar code.

At step 850, once the IP gateway 60 receives the product identifiers (e.g., SKU data) from a merchant or an acquirer with relationship with one or more merchants, receipts can be delivered to the consumer 10 in the manner preferred by the consumer 10 (if they have not already been delivered by the merchant 20) (arrow 310 in FIG. 1B).

Embodiments of the invention are not limited to the particular flows described above with respect to FIG. 1A. For example, participation request messages are sent to the IP gateway 60 by a server computer in the payment processing network 40 after an authorization response message is received from the issuer 50 in the specifically described embodiment. However, it is also understood that in other embodiments, participation request messages may be sent by the payment processing network 40 to the IP gateway after it receives an authorization request message. Receipt preference data can be determined by the payment processing network 40 before an authorization request message is sent to the issuer 50 or while the issuer 50 is deciding whether or not to authorize the current transaction. The latter is advantageous, since receipt preference data can be obtained while the issuer 50 is making a decision, thereby minimizing the delay in processing the authorization response and request messages. Also, in other embodiments of the invention, an IP Gateway is not necessary, and processing can be performed solely by an intermediate server computer (e.g., a server computer in a payment processing network).

Note that in some embodiments of the invention, the authorization response request message may be sent to the issuer and an authorization response message may be received from the issuer in less than about 3, 2, or 1 minutes or less than about 20 seconds.

Embodiments of the invention have a number of advantages. For example, embodiments of the invention allow a consumer to enroll in a receipt program that can be used across multiple merchants, and not just a single merchant. This is advantageous to the consumer because he only has to sign up once and has one central location to manage all receipts. This also provides the consumer which much more information and tools by which he can manage his transactions and receipts. This is also advantageous to the merchant because it reduces the merchant's overhead (e.g., reduces the amount of paper used by merchants, improves customer processing speed, etc.). Further, a merchant can use the receipt program as part of its inventory control. For example, a merchant may have records of what merchandise has been stocked for sale and then may have an electronic register, but nothing to actually link the electronic cash register to what they have put into inventory. The merchant can then use the receipt data and program to track what has actually been purchased. The merchant can merge this data to manage inventory and determine when it needs to restock. This may be particularly advantageous to small business owners who cannot afford expensive inventory control systems. The merchant could also use the receipt data for auditing purposes.

Moreover, as explained earlier, because of embodiments of the invention, various potential merchants can accept payment cards in cases where paper receipts are not traditionally provided. Since electronic receipts can be provided instead of paper receipts, embodiments of the invention can help merchants that could not previously satisfy Regulation E which requires a receipt if a cardholder uses a payment card to make a purchase.

Embodiments of the invention are not limited to the above-described embodiments. For example, although separate functional blocks are shown for an issuer, payment processing network, and acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

generating, by an access device, an authorization request message for a transaction conducted by a consumer with a merchant, after the access device interacts with a portable consumer device;

sending, by the access device, the authorization request message to a server computer, wherein the server computer forwards the authorization request message to an issuer, receives an authorization response message from the issuer, and modifies the authorization response message to include receipt preference data in the form of a code or binary data to create the modified authorization response message, the receipt preference data stored in the server computer, indicating the consumer's preferences for receiving receipts from multiple merchants, and provided to the server computer by the consumer before the transaction;

receiving, by the access device and from the server computer, a modified authorization response message including an indication that the transaction is approved, and the receipt preference data;

creating, by the access device, a receipt according to the user's preferences using the receipt preference data comprising the code or the binary data; and providing, by the access device, the receipt according to the user's preferences to the consumer, wherein the receipt preference data comprises the code, which includes a plurality of subcodes, the plurality of subcodes indicating different receipt preferences of the consumer.

2. The method of claim 1 wherein the receipt preference data includes printing preferences specified by the consumer.

3. The method of claim 1 wherein the server computer is in a payment processing network.

4. The method of claim 1, wherein the portable consumer device is a mobile phone.

5. The method of claim 1 wherein the portable consumer device is a credit card.

6. The method of claim 1 wherein the receipt preference data specifies whether or not the consumer desires a paper receipt.

7. The method of claim 1 wherein the receipt preference data is associated with a delivery channel, a receipt format, a file type, and/or conditions for receipts.

8. The method of claim 1 wherein the access device is a POS terminal.

9. The method of claim 1 wherein the receipt preference data stored at the server computer specifies that the receipt is also transmitted to a mobile phone used by the consumer.

10. An access device comprising:

a processor; and a computer readable medium comprising code executable by the processor, for implementing a method comprising:

generating, by the access device, an authorization request message for a transaction conducted by a consumer with a merchant, after the access device interacts with a portable consumer device;

sending, by the access device, the authorization request message to a server computer in a payment processing network, wherein the server computer forwards the authorization request message to an issuer, receives an authorization response message from the issuer, and modifies the authorization response message to include receipt preference data in the form of a code or binary data to create the modified authorization response message, the receipt preference data stored in the server computer, indicating the consumer's preferences for receiving receipts from multiple merchants, and provided to the server computer by the consumer before the transaction;

receiving, by the access device and from the server computer in the payment processing network, a modified authorization response message including an indication that the transaction is approved, and the receipt preference data;

creating, by the access device, a receipt according to the user's preferences using the receipt preference data comprising the code or the binary data; and providing, by the access device, the receipt according to the user's preferences to the consumer, wherein the receipt preference data includes the binary data, the binary data includes individual bits that identify specific receipt preferences.

11. The access device of claim 10 wherein the receipt preference data includes printing preferences specified by the consumer.

12. The access device of claim 10, wherein the portable consumer device is a mobile phone.

13. The access device of claim 10 wherein the portable consumer device is a credit card.

14. The access device of claim 10 wherein the receipt preference data specifies whether or not the consumer desires a paper receipt.

15. The access device of claim 10 wherein the authorization request message is sent from the access device to the server computer in the payment processing network via an acquirer computer.

16. The access device of claim 10 wherein the receipt preference data includes a delivery channel, a receipt format, a file type, and/or conditions for receipts.

17. The access device of claim 10 wherein the access device is a POS terminal.

18. The access device of claim 10 wherein the receipt preference data stored in the server computer specifies that the receipt is also transmitted to a mobile phone used by the consumer.

* * * * *